US007974841B2

(12) United States Patent
Bengtsson (10) Patent No.: US 7,974,841 B2
(45) Date of Patent: Jul. 5, 2011

(54) ELECTRONIC DEVICES AND METHODS THAT ADAPT FILTERING OF A MICROPHONE SIGNAL RESPONSIVE TO RECOGNITION OF A TARGETED SPEAKER'S VOICE (75) Inventor: Henrik Sven Bengtsson, Lund (SE)

(73) Assignee: Sony Ericsson Mobile Communications AB (SE)

( * ) Notice: Subject to any disclaimer, the term of this patent is extended or adjusted under 35 U.S.C. 154(b) by 786 days.

(21) Appl. No.: 12/038,118

(22) Filed: Feb. 27, 2008

(65) Prior Publication Data
US 2009/0216529 A1 Aug. 27, 2009

(51) Int. Cl.
G10L 15/20 (2006.01)
(52) U.S. Cl. ........ 704/233; 704/200; 704/205; 704/207; 704/246; 381/66
(58) Field of Classification Search .................. 704/233, 704/200, 205, 207, 246
See application file for complete search history.

(56) References Cited

U.S. PATENT DOCUMENTS

| 6,963,937 | B1 * | 11/2005 | Kamper et al. ................. 710/73 |
| 7,043,427 | B1 | 5/2006 | Kern et al. |
| 7,054,436 | B2 | 5/2006 | Stenmark |
| 7,068,797 | B2 | 6/2006 | Isberg et al. |
| 7,123,727 | B2 * | 10/2006 | Elko et al. ........................ 381/92 |
| 7,206,418 | B2 | 4/2007 | Yang et al. |
| 7,720,683 | B1 * | 5/2010 | Vermeulen et al. ........... 704/254 |
| 2003/0100345 | A1 | 5/2003 | Gum |
| 2003/0151678 | A1 | 8/2003 | Lee et al. |
| 2005/0036036 | A1 * | 2/2005 | Stevenson et al. ........ 348/211.99 |
| 2008/0082332 | A1 * | 4/2008 | Mallett et al. ................. 704/250 |
| 2008/0133225 | A1 * | 6/2008 | Yamada ......................... 704/207 |
| 2010/0217585 | A1 * | 8/2010 | Karlsson et al. .............. 704/219 |

FOREIGN PATENT DOCUMENTS

| WO | WO 2004/053839 A1 | 6/2004 |
| WO | WO 2006/121896 A2 | 11/2006 |

OTHER PUBLICATIONS

Clapper, "Word Recognizers with Filters Automatically Adjusted to Speaker" IBM Technical Disclosure Bulleting, vol. 13, No. 3, Aug. 1970.*

(Continued)

Primary Examiner — Vincent P Harper
(74) Attorney, Agent, or Firm — Myers Bigel Sibley & Sajovec, PA (57) ABSTRACT Electronic devices and methods are disclosed that adaptively filter a microphone signal responsive to recognition of a targeted speaker's voice. An electronic device can include a microphone, a speaker characterization circuit, an adaptive sound filter circuit, and a speaker recognition circuit. The speaker characterization circuit operates in a training mode to learn characteristics of the targeted speaker's voice component in the microphone signal, and to store the learned characteristics. The adaptive sound filter circuit adaptively filters the microphone signal responsive to a control signal. The speaker recognition circuit uses the learned characteristics to recognize the presence of the targeted speaker's voice in the microphone signal and to regulate the control signal to cause the adaptive sound filter circuit to adapt the filtering to increase the targeted speaker's voice component of the microphone signal relative to other components.

15 Claims, 5 Drawing Sheets

OTHER PUBLICATIONS

Invitation to Pay Additional Fees and, Where Applicable, Protest Fee, Communication Related to the Results of the Partial International Search, PCT International Application No. PCT/IB2008/002283, Feb. 12, 2009.

Notification of Transmittal of The International Search Report and The Written Opinion of the International Searching Authority, or the Declaration, International Search Report and Written Opinion of the International Searching Authority, PCT International Application No. PCT/I B2008/002283, Apr. 9, 2009.

Omologo et al. "Environmental conditions and acoustic transduction in hands-free speech recognition" *Speech Communication* 25:75-95 (1998).

Stanford et al. "The NIST Smart Space and Meeting Room Projects: Signals, Acquisition, Annotation, and Metrics" *IEEE International Conference on Acoustics, Speech, and Signal Processing Proceeding* IV:736-739 (2003).

* cited by examiner

ELECTRONIC DEVICES AND METHODS THAT ADAPT FILTERING OF A MICROPHONE SIGNAL RESPONSIVE TO RECOGNITION OF A TARGETED SPEAKER'S VOICE

BACKGROUND OF THE INVENTION

The present invention relates to electronic devices that can record microphone signals, and, more particularly, to filtering microphone signals in cellular terminals, camcorders, and other electronic devices.

Audio recording capabilities are increasingly being incorporated into a wide variety of electronic devices. For example, most cellular mobile communication terminals and digital cameras can record audio and video to provide camcorder type functionality. Background noise can have numerous undesirable affects on the recorded audio. For example, the background noise may obscure or mask the voice of a particular person who the operator of the device wants to record. Background noise can include wind noise and other noise sources, such as vehicles, voices from persons other than the user and/or background music.

SUMMARY OF THE INVENTION

Various embodiments of the present invention are directed to electronic devices and methods that adaptively filter a microphone signal responsive to recognition of a targeted speaker's voice.

According to some embodiments, an electronic device includes a microphone and a sound processor. The microphone generates a microphone signal responsive to incident sound. The sound processor is configured to recognize a targeted speaker's voice within the microphone signal and to regulate filtering of the microphone signal responsive to the recognition of the targeted speaker's voice.

In some further embodiments, the sound processor includes a speaker characterization circuit, an adaptive sound filter circuit, and a speaker recognition circuit. The speaker characterization circuit is configured to operate in a training mode to learn characteristics of the targeted speaker's voice component in the microphone signal, and to store the learned characteristics. The adaptive sound filter circuit is configured to adaptively filter the microphone signal responsive to a control signal. The speaker recognition circuit is configured to use the learned characteristics to recognize the presence of the targeted speaker's voice in the microphone signal and to regulate the control signal to cause the adaptive sound filter circuit to adapt the filtering to increase the targeted speaker's voice component of the microphone signal relative to other components.

In some further embodiments, the adaptive sound filter circuit includes a variable bandpass filter having bandpass frequencies that are varied in response to the control signal. The speaker recognition circuit is further configured to respond to recognition of the presence of the targeted speaker's voice in the microphone signal by using the learned characteristics to determine a frequency range of the targeted speaker's voice and by regulating the control signal to vary the bandpass frequencies of the variable bandpass filter in response to the determined frequency range of the targeted speaker's voice.

In some further embodiments, the adaptive sound filter circuit includes a high-pass filter having a cutoff frequency that is varied in response to the control signal. The speaker recognition circuit is further configured to respond to recognition of the presence of the targeted speaker's voice in the microphone signal by using the learned characteristics to determine a lower frequency range of the targeted speaker's voice and by regulating the control signal to vary the cutoff frequency of the high-pass filter in response to the determined lower frequency range.

In some further embodiments, the speaker characterization circuit is further configured to operate during the training mode to learn, from the targeted speaker's voice component in the microphone signal, a time-varying spectral pattern of the targeted speaker's voice as the targeted speaker vocalizes a particular song/speech. The speaker recognition circuit is further configured to use the learned time-varying spectral pattern to recognize the presence of the targeted speaker's voice in the microphone signal vocalizing the particular song/speech, and to respond to the recognized presence by using the learned time-varying spectral pattern to vary the control signal over time to dynamically tune the adaptive sound filter circuit to track the expected time-varying spectral pattern of the targeted speaker's voice during the song/speech and to increase the targeted speaker's voice component in the microphone relative to other components.

In some further embodiments, the adaptive sound filter circuit includes a variable bandpass filter having bandpass frequencies that are varied in response to the control signal. The speaker characterization circuit is further configured to learn the time-varying spectral pattern by characterizing differences over time in the frequency range of the targeted speaker's voice in the microphone signal as the targeted speaker vocalizes the particular song/speech. The speaker recognition circuit is further configured to use the learned time-varying spectral pattern to tune the bandpass frequencies of the bandpass filter to follow the differences over time in the frequency range of the targeted speaker's voice so as to increase the targeted speaker's voice component in the microphone signal relative to other components during the particular song/speech.

In some further embodiments, the speaker characterization circuit is further configured to learn timing of gaps where the targeted speaker's voice in the microphone signal has less than a threshold amplitude as the targeted speaker vocalizes the particular song/speech. The speaker recognition circuit is further configured to use the learned gap timing to vary the control signal over time to increase the other components of the microphone signal relative to the component of the targeted speaker's voice in the microphone signal during each of the gaps and to increase the component of the targeted speaker's voice relative to the other components of the microphone signal in-between each of the gaps.

In some further embodiments, the adaptive sound filter circuit includes a variable gain amplifier that amplifies the microphone signal and has a gain that is varied in response to the control signal. The speaker characterization circuit is further configured to operate during the training mode to learn, from the targeted speaker's voice component in the microphone signal, a time-varying amplitude pattern of the targeted speaker's voice as the targeted speaker vocalizes a particular song/speech. The speaker recognition circuit is further configured to respond to the recognized presence of the targeted speaker's voice by using the learned time-varying amplitude pattern to vary the control signal over time to dynamically tune the gain of the variable gain amplifier to track the expected time-varying amplitude pattern of the targeted speaker's voice during the song/speech.

In some further embodiments, the electronic device further includes a radiofrequency receiver and a distance determination circuit. The radio frequency receiver is configured to receive a wireless communication signal from a remote transmitter that is carried by the targeted speaker. The distance determination circuit is configured to determine a signal strength of the received communication signal, and to estimate distance from the electronic device to the remote transmitter in response to the received signal strength. The speaker characterization circuit is further configured to adapt the learned characteristics of the targeted speaker's voice in response to the estimated distance from the electronic device to the remote transmitter to compensate for expected effects of distance on characteristics of the targeted speaker's voice component during the filtering of the microphone signal.

In some further embodiments, the electronic device further includes an image sensor and a distance determination circuit. The image sensor is configured to generate an image signal. The distance determination circuit is configured to recognize presence of a person in the image signal that is expected to correspond or be proximately located to the targeted speaker, and to estimate distance from the electronic device to the person in response to size of the person relative to a plurality of threshold values. The speaker characterization circuit is further configured to adapt the learned characteristics of the targeted speaker's voice in response to the estimated distance from the electronic device to the recognized person to compensate for expected effects of distance on characteristics of the targeted speaker's voice component during the filtering of the microphone signal.

In some further embodiments, the radio frequency receiver is configured to receive a wireless communication signal from a remote transmitter that is carried by the targeted speaker. The distance determination circuit is configured to determine a signal strength of the received communication signal, and to estimate distance from the electronic device to the remote transmitter in response to the received signal strength. The microphone includes a zoom/beam steerable microphone having a plurality of microphone elements and a controllable phase combiner circuit that adjusts relative phase between signals from the microphone elements in response to a phase control signal and combines the adjusted phase signals to generate the microphone signal. The speaker recognition circuit is further configured to regulate the phase control signal in response to recognizing the presence of the targeted speaker's voice in the microphone signal and the estimated distance from the electronic device to the remote transmitter to increase the targeted speaker's voice component in the microphone signal relative to other components.

In some further embodiments, the image sensor is configured to generate an image signal. The distance determination circuit is configured to recognize the presence of a person in the image signal, and to estimate distance from the electronic device to the person in response to size of the person relative to a plurality of threshold values. The microphone includes a zoom/beam steerable microphone having a plurality of microphone elements and a controllable phase combiner circuit that adjusts relative phase between signals from the microphone elements in response to a phase control signal and combines the adjusted phase signals to generate the microphone signal. The speaker recognition circuit is further configured to regulate the phase control signal in response to recognizing the presence of the targeted speaker's voice in the microphone signal and the estimated distance from the electronic device to the recognized person to increase the targeted speaker's voice component in the microphone signal relative to other components.

In some further embodiments, the electronic device further includes an audio recorder that records the filtered microphone signal from the adaptive sound filter.

Some other embodiments of the present invention are directed to a method that includes computer-implemented recognition of a targeted speaker's voice within a microphone signal and regulation of filtering of the microphone signal responsive to the recognition of the targeted speaker's voice.

In some further embodiments, the method further includes computer-implemented learning of characteristics of the targeted speaker's voice component in the microphone signal during a training mode, and using the learned characteristics to recognize the presence of the targeted speaker's voice in the microphone signal and to regulate a control signal to cause an adaptive sound filter circuit to adapt filtering of the microphone signal to increase the targeted speaker's voice component of the microphone signal relative to other components.

In some further embodiments, the method further includes computer-implemented learning characteristic differences over time in the frequency range of the targeted speaker's voice in the microphone signal as the targeted speaker vocalizes a particular song/speech during the training mode. The method also includes computer-implemented responding to the recognized presence of the targeted speaker's voice in the microphone signal by using the learned characteristic differences over time in the frequency range of the targeted speaker's voice to vary the control signal over time to dynamically tune the adaptive sound filter circuit to track the expected characteristic differences over time in the frequency range of the targeted speaker's voice during the particular song/speech and to increase the targeted speaker's voice component in the microphone relative to other components.

In some further embodiments, the method further includes computer-implemented learning characteristic differences over time in the amplitude pattern of the targeted speaker's voice in the microphone signal as the targeted speaker vocalizes a particular song/speech during the training mode. The method also includes computer-implemented responding to the recognized presence of the targeted speaker's voice in the microphone signal by using the learned characteristic differences over time in the amplitude pattern of the targeted speaker's voice to vary the control signal over time to dynamically tune a gain of a variable gain amplifier in the adaptive sound filter circuit that amplifies the microphone signal to track the expected characteristic differences over time in the amplitude pattern of the targeted speaker's voice during the particular song/speech.

In some further embodiments, the method further includes computer-implemented learning timing of gaps where the targeted speaker's voice in the microphone signal has less than a threshold amplitude as the targeted speaker vocalizes the particular song/speech during the training mode. The method also includes computer-implemented responding to the recognized presence of the targeted speaker's voice in the microphone signal by using the learned timing of gaps to vary the control signal over time to dynamically tune the adaptive sound filter circuit to increase the other components of the microphone signal relative to the component of the targeted speaker's voice in the microphone signal during each of the gaps and to increase the component of the targeted speaker's voice relative to the other components of the microphone signal in-between each of the gaps.

In some further embodiments, the method further includes computer-implemented estimation of distance from an electronic device to a remote transmitter that is carried by the targeted speaker in response to strength of a signal that is received by the electronic device from the remote transmitter. The method also includes computer-implemented adaptation of the learned characteristics of the targeted speaker's voice in response to the estimated distance from the electronic device to the remote transmitter to compensate for expected effects of distance on characteristics of the targeted speaker's voice component during the filtering of the microphone signal.

Some other embodiments of the present invention are directed to an electronic device that includes a microphone, a speaker characterization circuit, an adaptive sound filter circuit, and a speaker recognition circuit. The microphone generates a microphone signal responsive to incident sound. The speaker characterization circuit is configured to operate in a training mode to learn, from the targeted speaker's voice component in the microphone signal, time-varying differences in the frequency range and/or amplitude pattern of the targeted speaker's voice as the targeted speaker vocalizes a particular song/speech. The adaptive sound filter circuit is configured to adaptively filter the microphone signal responsive to a control signal. The adaptive sound filter circuit includes a variable bandpass filter having bandpass frequencies that are varied in response to the control signal and/or a variable gain amplifier having a gain that is varied in response to the control signal. The speaker recognition circuit is configured to use the learned time-varying differences in the frequency range and/or amplitude pattern of the targeted speaker's voice to recognize the presence of the targeted speaker's voice in the microphone signal vocalizing the particular song/speech, and to respond to the recognized presence by using the time-varying differences in the frequency range and/or the amplitude pattern of the targeted speaker's voice to vary the control signal over time to dynamically tune the bandpass frequencies of the bandpass filter to follow the differences over time in the frequency range of the targeted speaker's voice and/or to dynamically tune the gain of the variable gain amplifier to follow the differences over time in the amplitude pattern of the targeted speaker's voice.

Other electronic devices and/or methods according to embodiments of the invention will be or become apparent to one with skill in the art upon review of the following drawings and detailed description. It is intended that all such additional electronic devices and methods be included within this description, be within the scope of the present invention, and be protected by the accompanying claims.

BRIEF DESCRIPTION OF THE DRAWINGS

The accompanying drawings, which are included to provide a further understanding of the invention and are incorporated in and constitute a part of this application, illustrate certain embodiments of the invention. In the drawings.

DETAILED DESCRIPTION OF EMBODIMENTS OF THE INVENTION

Various embodiments of the present invention will now be described more fully hereinafter with reference to the accompanying drawings. However, this invention should not be construed as limited to the embodiments set forth herein. Rather, these embodiments are provided so that this disclosure will be thorough and complete, and will convey the scope of the invention to those skilled in the art.

It will be understood that, as used herein, the term "comprising" or "comprises" is open-ended, and includes one or more stated elements, steps and/or functions without precluding one or more unstated elements, steps and/or functions. As used herein, the singular forms "a", "an" and "the" are intended to include the plural forms as well, unless the context clearly indicates otherwise. The term "and/or" and "/" includes any and all combinations of one or more of the associated listed items. In the drawings, the size and relative sizes of regions may be exaggerated for clarity. Like numbers refer to like elements throughout.

Some embodiments may be embodied in hardware and/or in software (including firmware, resident software, microcode, etc.). Consequently, as used herein, the term "signal" may take the form of a continuous waveform and/or discrete value(s), such as digital value(s) in a memory or register. Furthermore, various embodiments may take the form of a computer program product on a computer-usable or computer-readable storage medium having computer-usable or computer-readable program code embodied in the medium for use by or in connection with an instruction execution system. Accordingly, as used herein, the terms "circuit" and "controller" may take the form of digital circuitry, such as computer-readable program code executed by an instruction processing device(s) (e.g., general purpose microprocessor and/or digital signal microprocessor), and/or analog circuitry. The operations that are described below with regard to FIGS. 4-6 can therefore be at least partially implemented as computer-readable program code executed by a computer (e.g., microprocessor).

Embodiments are described below with reference to block diagrams and operational flow charts. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

In accordance with various embodiments of the present invention, an electronic device includes a microphone and a sound processor. The microphone generates a microphone signal responsive to incident sound. The sound processor is configured to recognize a targeted speaker's voice within the microphone signal and to regulate filtering of the microphone signal responsive to the recognition of the targeted speaker's voice.

For purposes of illustration and explanation only, various embodiments are described herein in the context of an exemplary wireless mobile communication terminal ("terminal"), such as a cellular terminal, that includes a local area network (WLAN) and Bluetooth communication capability. It will be understood, however, that the present invention is not limited to such embodiments and may be embodied generally in any electronic device that filters a microphone signal, such as a sound ("audio") recording device or audio and video recorder (e.g., camcorder), that operates in accordance with at least one embodiment described herein. Further non-limiting exemplary electronic devices include a digital audio recorder, a personal data assistant (PDA), digital camera, and a laptop/palmtop/desktop computer.

Figure 1:
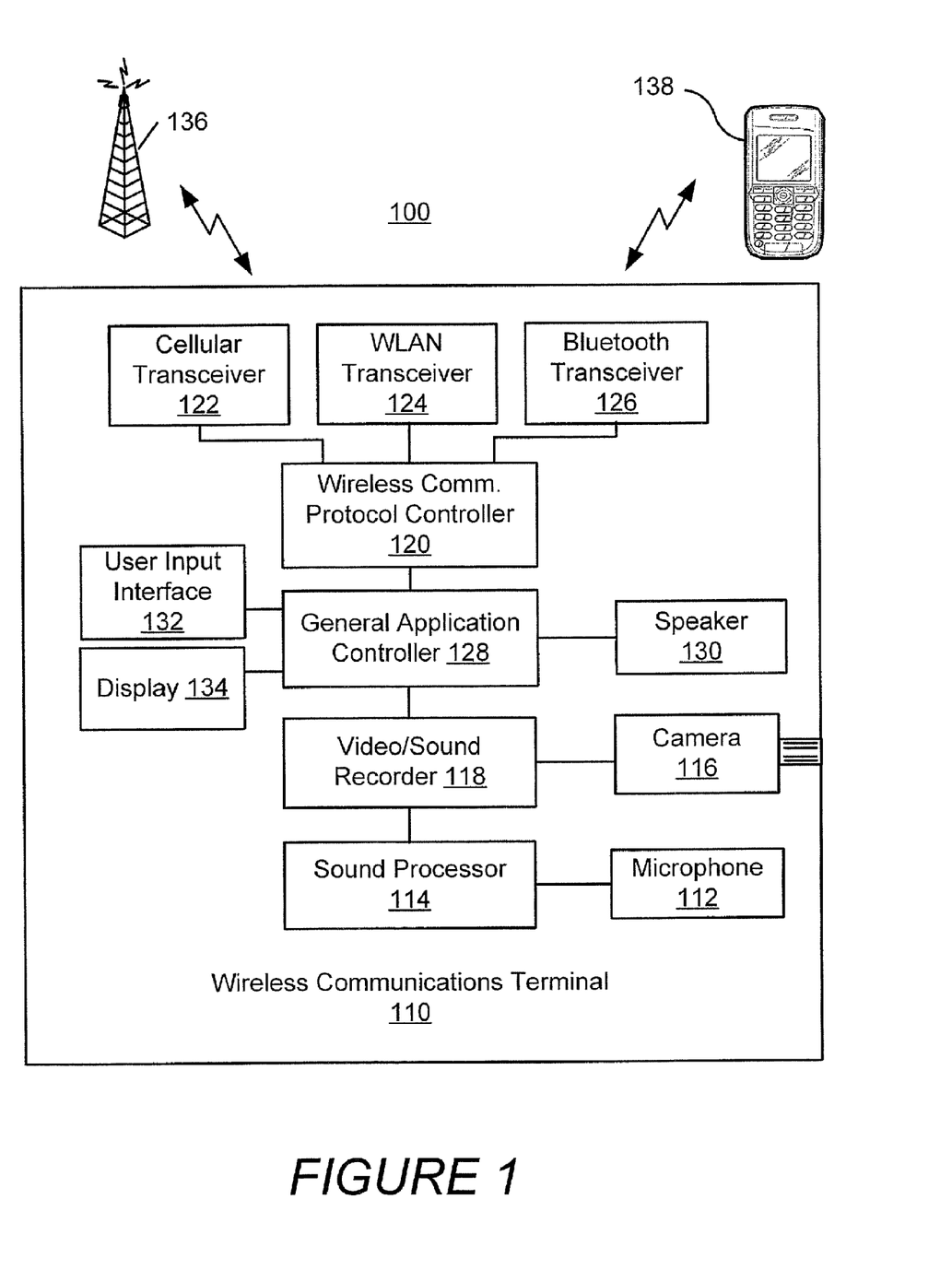
FIG. 1 is a block diagram of a wireless communication system that includes a wireless communication terminal that is configured to adaptively filter a microphone signal in response to recognition of a targeted speaker's voice in accordance with some embodiments of the present invention.

FIG. 1 is a block diagram of a wireless communication system 100 that includes a terminal 110 that is configured to adaptively filter a microphone signal in response to recognition of a targeted speaker's voice. Referring to FIG. 1, the terminal 110 includes a microphone 112, a sound processor 114, a camera 116, and a video and sound recorder 118. The terminal 110 may thereby be configured as a video-sound recorder to record both video and sound.

The terminal 110 can further include a wireless communication protocol controller 120, a cellular transceiver 122, a WLAN transceiver 124 (e.g., compliant with one or more of the IEEE 801.11a-g standards), and a Bluetooth transceiver 126. The cellular transceiver 122 can be configured to communicate using one or more cellular communication protocols such as, for example, Global Standard for Mobile (GSM) communication, General Packet Radio Service (GPRS), enhanced data rates for GSM evolution (EDGE), Integrated Digital Enhancement Network (iDEN), code division multiple access (CDMA), wideband-CDMA, CDMA2000, and/or Universal Mobile Telecommunications System (UMTS). The terminal 110 may thereby be configured to communicate across a wireless air interface with a cellular transceiver base station 136 and with another terminal 138 via the WLAN transceiver 124 and/or the Bluetooth transceiver 126.

The terminal 110 can further include a general application controller 128 that may control the various other components of the terminal 110, and may be configured to provide user selectable applications that are responsive to a user input interface 132 to control the video and sound recorder 118 to provide sound and video recording and playback functionality through a speaker 130 and a display 134. Various exemplary components and operations of the sound processor 114 and the microphone 112 are described below with regard to the block diagram of FIG. 2.

Figure 2:
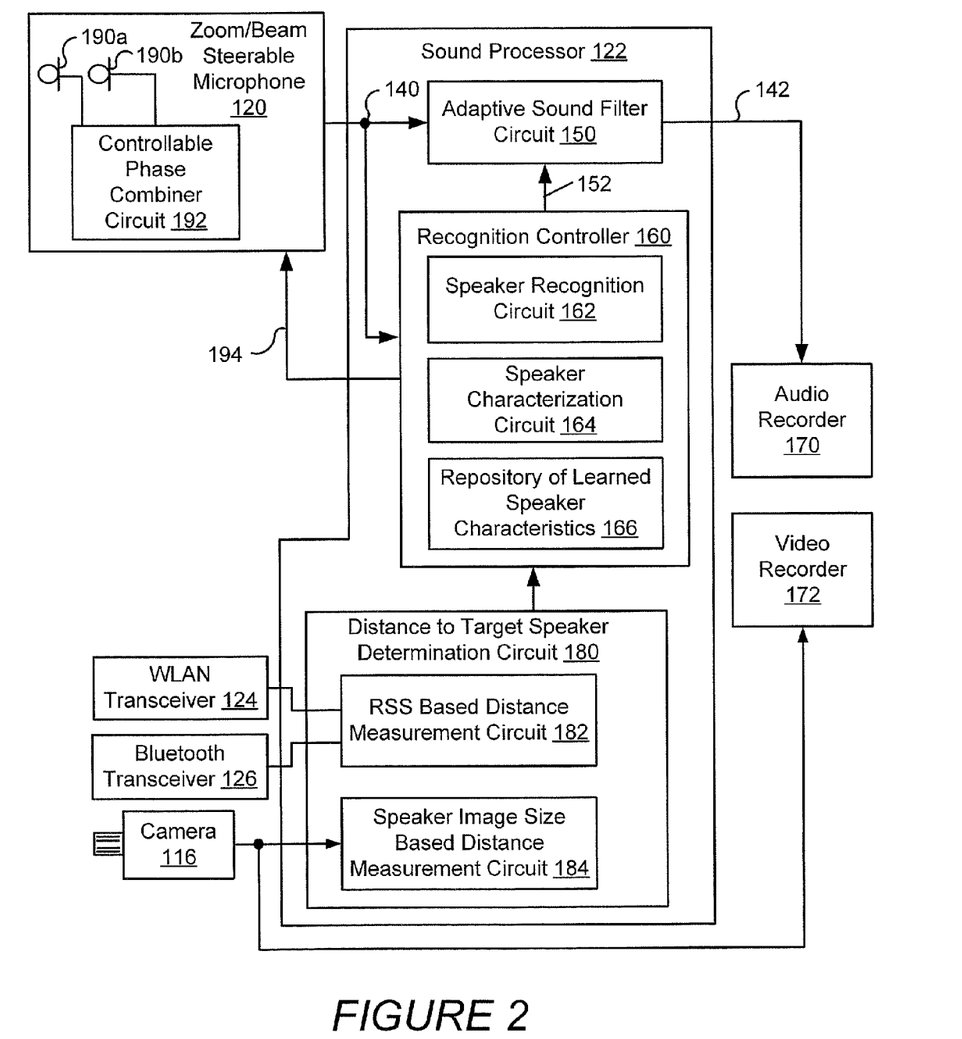
FIG. 2 is a block diagram of several components of the wireless communication terminal of FIG. 1, including the sound processor therein, that are configured in accordance with some embodiments of the present invention.

Referring to FIG. 2, the sound processor 114 is configured to recognize a targeted speaker's voice within a microphone signal 140 from the microphone 112 and to regulate filtering of the microphone signal 140 responsive to the recognition of the targeted speaker's voice. The sound processor 114 includes an adaptive sound filter circuit 150 and a voice recognition controller 160. The adaptive sound filter circuit 150 is configured to adaptively filter the microphone signal 140 responsive to a control signal 152. The recognition controller 160 includes a speaker recognition circuit 162, a speaker characterization circuit 164, and a repository that stores learned speaker characteristics 166. The repository 166 may include one or more semiconductor memories and/or other data storage devices, such as a hard disk drive and/or CD/DVD drive.

The speaker characterization circuit 164 is configured to operate in a training mode to learn characteristics of the targeted speaker's voice component in the microphone signal 140, and to store the learned characteristics in the repository 166. The characteristics learned by the speaker characterization circuit 164 may include, but are not limited to, the average/maximum/minimum frequency spectrum (bandwidth), the pitch, and/or the cadence of the speaker's voice.

The speaker recognition circuit 164 is configured to use the learned characteristics to recognize the presence of the targeted speaker's voice in the microphone signal 140 during a recording mode, which can be subsequent to the learning mode. Responsive to such recognition, the speaker recognition circuit 164 can regulate the control signal 152 to cause the adaptive sound filter circuit 150 to adapt the filtering to increase the targeted speaker's voice component relative to other components in the filtered signal 142 that is provided to an audio recorder 170 within the video and sound recorder 118.

In some embodiments, the adaptive sound filter circuit 150 includes a variable bandpass filter having bandpass frequencies (e.g., upper and lower attenuation corner frequencies) that are varied in response to the control signal 152. The speaker recognition circuit 162 can respond to recognition of the presence of the targeted speaker's voice in the microphone signal 140 by using the learned characteristics (from the repository 166) to determine a frequency range of the targeted speaker's voice and by regulating the control signal 152 to vary the bandpass frequencies of the variable bandpass filter in response to the determined frequency range. Accordingly, the bandpass filter can be tuned to increase the targeted speaker's voice component relative to other components in the filtered signal 142 in response to recognizing the presence of the targeted speaker's voice and the associated learned characteristics thereof.

In some other embodiments, the adaptive sound filter circuit 150 includes a high-pass filter that filters the microphone signal 140. The high-pass filter has a cutoff frequency that is varied in response to the control signal 152. The speaker recognition circuit 162 can respond to recognition of the presence of the targeted speaker's voice in the microphone signal 140 by using the learned characteristics to determine a lower frequency range of the targeted speaker's voice and by regulating the control signal to vary the cutoff frequency of the high-pass filter in response to the determined lower frequency range.

Figure 3:
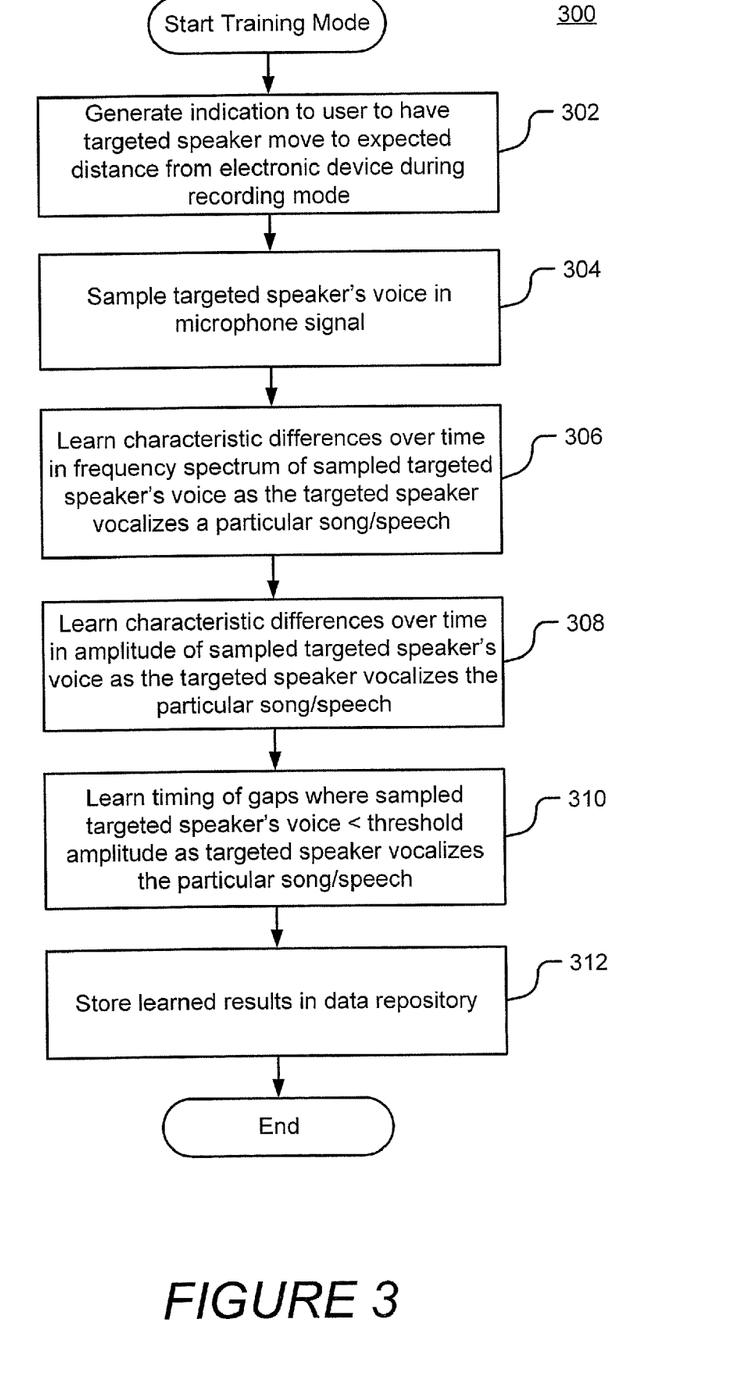
FIG. 3 is a flowchart that illustrates operations and methods during a training mode which may be carried out by the wireless communication terminal of FIG. 1 to learn various characteristics of a targeted speaker's voice as the targeted speaker vocalizes a particular song/speech in accordance with some embodiments of the present invention.

In some further embodiments, the speaker characterization circuit 164 can be configured to learn characteristics associated with the time varying pattern of the speaker's voice as the targeted speaker vocalizes a particular song/speech. FIG. 3 is a flowchart of exemplary operations and methods 300 may be carried out by the recognition controller 160 during a learning mode in accordance with various embodiments of the present invention. Referring to FIG. 3, the speaker characterization circuit 164 may cause an instruction (operation 302) to be generated on the display 134 which instructs an operator to have a targeted speaker move to the expected distance away from the terminal 110 that will be experience during a subsequent targeted recording. In this manner, the speaker's voice during the training mode will be subjected to similar attenuation and other effects of the distance as will be experience during a subsequent recording mode. The speaker characterization circuit 164 receives discrete samples (operation 304) of the targeted speaker's voice in the microphone signal 140.

The speaker characterization circuit 164 is further configured to learn a time-varying spectral pattern of the targeted speaker's voice component in the microphone signal 140 as the targeted speaker vocalizes a particular song/speech. The speaker characterization circuit 164 may be configured to characterize (operation 306) the differences over time in the frequency spectrum of the targeted speaker's voice in the microphone signal 140 as the targeted speaker vocalizes the particular song/speech. The speaker characterization circuit 164 may alternatively or additionally be configured to characterize (operation 308) the differences over time in the amplitude of the targeted speaker's voice in the microphone signal 140 as the targeted speaker vocalizes the particular song/speech. Alternatively or additionally, the speaker characterization circuit 164 may be configured to learn the timing of gaps (operation 310) where the targeted speaker's voice in the microphone signal 140 has less than a threshold amplitude as the targeted speaker vocalizes the particular song/speech. The learned characteristics can be stored (operation 312) in the repository 166 for subsequent use by the speaker recognition circuit 162 during a recording mode.

Figure 4:
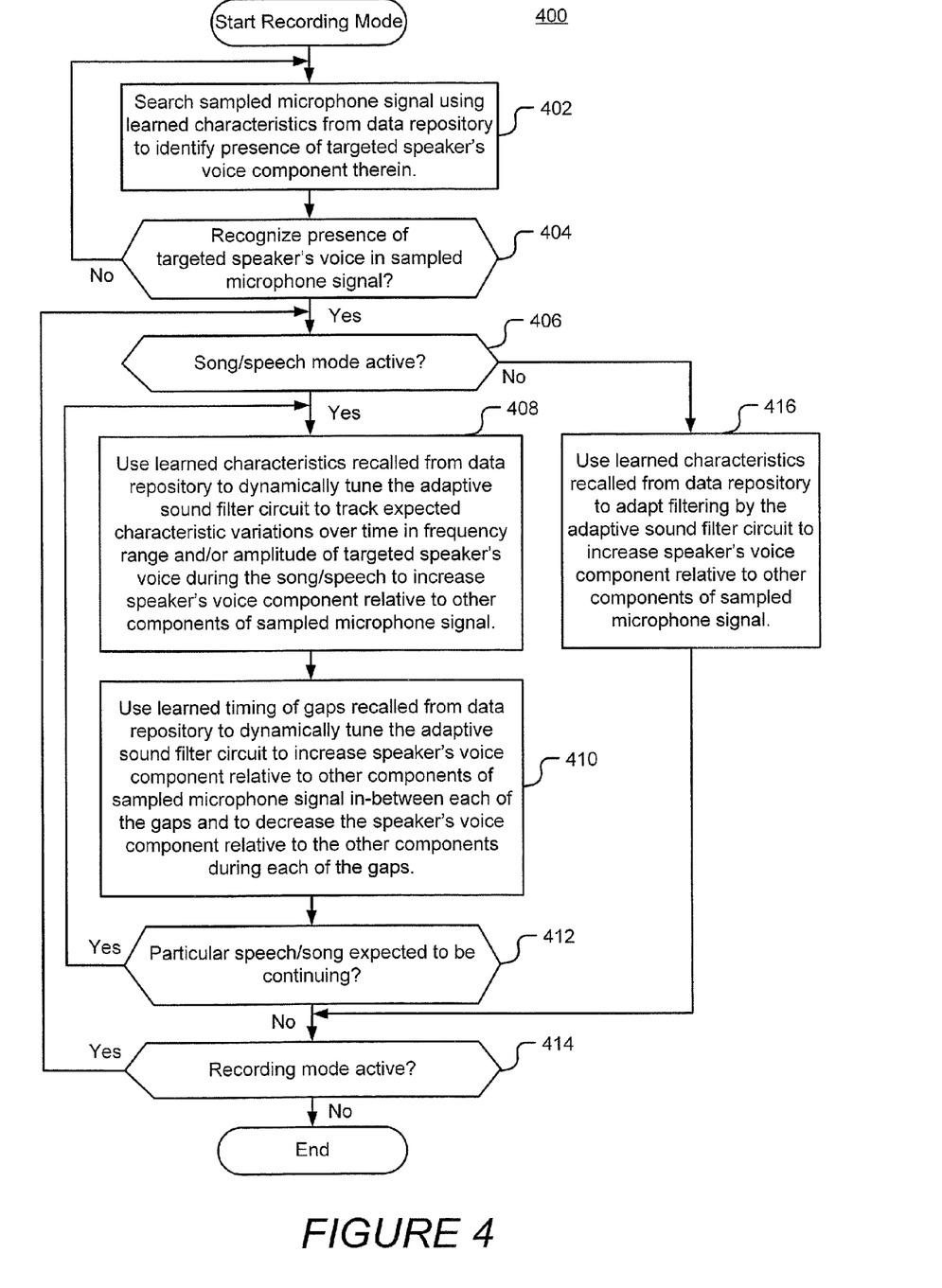
FIG. 4 is a flowchart that illustrates operations and methods during a recording mode which may be carried out by the wireless communication terminal of FIG. 1 to adapt/dynamically tune filtering by an adaptive sound filter circuit in response to the learned characteristics from the training mode in accordance with some embodiments of the present invention.

FIG. 4 is a flowchart that illustrates exemplary operations and methods 400 during the recording mode which may be carried out by the speaker recognition circuit 162 to semi-statically adapt or dynamically tune the filtering by the adaptive sound filter circuit 150 in response to the learned characteristics from the training mode. Referring to FIG. 4, the speaker recognition circuit 162 searches (operation 402) the sampled microphone signal using the learned characteristics from the repository 166 to attempt to identify the presence of a targeted speaker's voice component therein. The speaker recognition circuit 162 can be configured to use the learned time-varying spectral pattern, such as the learned variation in frequency range over time, of the targeted speaker's voice to recognize the presence of the targeted speaker's voice in the microphone signal, and which may occur while the speaker is vocalizing a previously trained song/speech.

When the targeted speaker's voice is determined (operation 404) to be present in the sample microphone signal, a further determination (operation 406) is then made as to whether the recognition controller 160 is operating in a song/speech mode. The song/speech mode may be set, for example, by a user (via the interface 132) to indicate that the filtering is to be dynamically tune to a song/speech for which the voice characteristics of already been learned.

When the song/speech mode is not active, the speaker recognition circuit 162 can use (operation 416) the learned characteristics from the repository 166 to semi-statically adapt (e.g., adapt responsive to initial recognition of the presence of the targeted speaker's voice) the filtering by the adaptive sound filter circuit 150 to increase the targeted speaker's voice component relative the other components of the sampled microphone signal.

For example, as described above, the speaker recognition circuit 162 can respond to recognition of the targeted speaker's voice component by varying the bandpass frequencies of a variable bandpass filter and/or varying the high-pass frequency of a high-pass filter in the adaptive sound filter circuit 150 in response to the frequency range characteristics of the targeted speaker's voice. The adaptive sound filter circuit 150 may be configured to carry out spectral subtraction, by transforming the time-sampled microphone signal into a number of frequency bins using a fast Fourier transform (FFT), and attenuating signal energy in frequency bins that are outside the learned frequency spectrum of the targeted speaker's voice.

When the song/speech mode is active, the speaker recognition circuit 162 can use (operation 408) the learned characteristics from the repository 166 to dynamically tune the adaptive sound filter circuit 150 to track the expected characteristic variations over time in the frequency range and/or in the an amplitude of the targeted speaker's voice during the song/speech to increase the targeted speaker's voice component relative to other components of the sampled microphone signal. The speaker recognition circuit 162 may, for example, regulate the control signal 152 to cause the adaptive sound filter circuit 150 to dynamically vary the frequency range of the bandpass filter and/or vary the high-pass frequency of the high-pass filter to track the expected changes over time in the targeted speaker's voice characteristics during the trained song/speech. Alternatively or additionally, the speaker recognition circuit 162 may regulate the control signal 152 to dynamically tune the gain of a variable gain amplifier in the adaptive sound filter circuit 150 that amplifies the microphone signal 140 to dynamically compensate for (e.g., track) the expected changes over time in the amplitude of the targeted speaker's voice during the trained song/speech. The speaker recognition circuit 162 may, for example, compensate for an expected decrease in the targeted speaker's voice at a particular instance in time by increasing the amplification gain that is applied to all components of the microphone signal 140 or that is supplied to a specific spectral component of the microphone signal 140 that has been learned to be characteristic of the targeted speaker's voice at that instant in time.

The speaker recognition circuit 162 may also use (operation 410) the learned timing of gaps, recalled from the repository 166, to dynamically tune the adaptive sound filter circuit 150 to increase the targeted speaker's voice component relative to other components of the sample microphone signal in-between each of the gaps, and to decrease the targeted speaker's voice component relative to the other components during each of the gaps.

Accordingly, when the targeted speaker is expected based on the learned characteristics to be not singing/speaking or doing so softly (e.g., below a threshold amplitude) at a particular instance in time, the adaptive sound filter circuit 150 can be tuned to reduce the filtering of the microphone signal 140 or to more neutrally apply the filtering with less bias toward the characteristics of the targeted speaker. For example, during each of the gaps, the speaker recognition circuit 162 may regulate the control signal 152 to cause the adaptive sound filter circuit 150 to expand the frequency range of the bandpass filter, lower the high-pass frequency of the high-pass filter, and/or increase/decrease the gain applied by the amplifier.

When the learned characteristics indicate (operation 412) that the speech/song is not yet expected to be completed, the speaker recognition circuit 162 can loop back to repeat the operations 408 and 410. In contrast, when the learned characteristics indicate that the speech/song is complete, a further determination is made (operation 414) as to whether the recording mode is still active and, when it is, the speaker recognition circuit 162 can loop back to repeat the determination operation 406 and the associated subsequent operations.

Referring again to FIG. 2, the sound processor 114 can further include a distance determination circuit 180 that is configured to determine the distance between the terminal 110 and a remote transmitter that can be carried by the targeted speaker. The distance determination circuit 180 can include a received signal strength (RSS) based distance measurement circuit 182 that is configured to determine signal strength of a communication signal received by, for example, the WLAN transceiver 124 and/or the Bluetooth transceiver 126. The RSS based distance measurement circuit 182 can estimate distance from the terminal 110 to the remote transmitter in response to the RSS.

Figure 5:
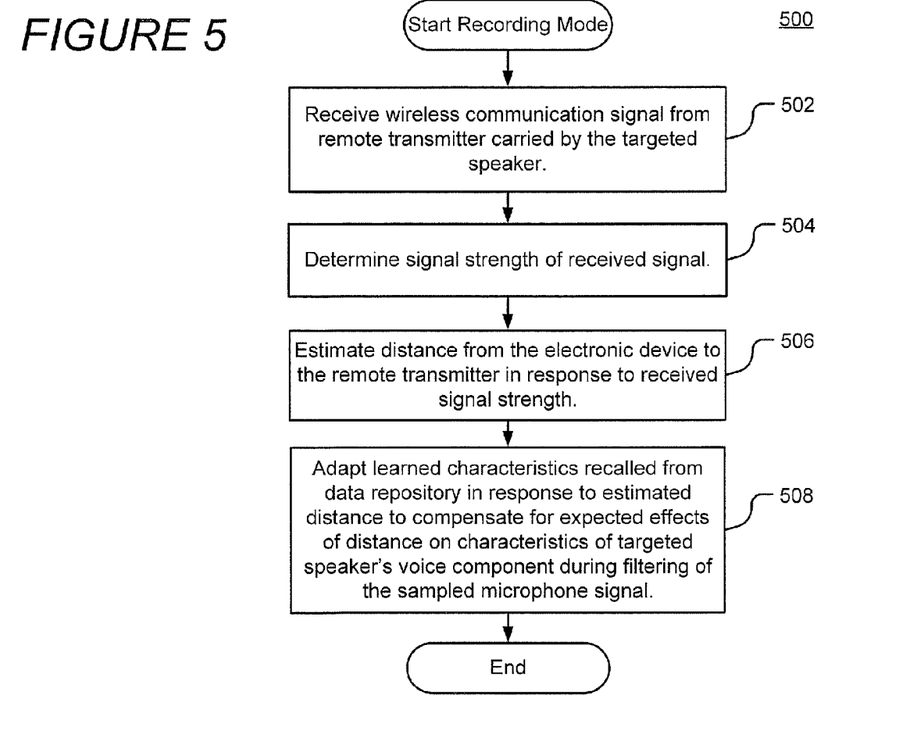
FIG. 5 is a flowchart that illustrates operations and methods during a recording mode which may be carried out by the wireless communication terminal of FIG. 1 to adapt the various learned characteristics from the training mode in response to estimated distance between the terminal and a remote transmitter carried by the targeted speaker in accordance with some embodiments of the present invention.

FIG. 5 is a flowchart that illustrates exemplary operations and methods 500 that may be carried out by the sound processor 114 to determine the distance between the terminal 110 and a remote transmitter carried by the targeted speaker and, responsive thereto, to adapt how the various learned characteristics in the repository 166 are used to control the adaptive sound filter circuit 150 compensate for the expected effects of the distance on the characteristics of the targeted speaker's voice component in the microphone signal 140.

Referring to FIG. 5, a wireless communication signal is received (operation 502) from a remote transmitter that can be carried by the targeted speaker. For example, the terminal 110 and the remote transmitter may communicate through a wireless local area network (WLAN) and/or through a Bluetooth network via the WLAN transceiver 124 and/or the Bluetooth transceiver 126, respectively. Accordingly, the remote transmitter may be a cellular telephone or PDA with a Bluetooth transceiver and/or WLAN transceiver that is networked to the terminal 110 and which may, for example, be in a clothes pocket of the targeted speaker.

The RSS based distance measurement circuit 182 determines the strength of the received signal (operation 504), and estimates (operation 506) the distance from the terminal 110 to the remote transmitter in response to the received signal strength. The RSS distance circuit 182 may estimate the distance using a defined relationship between an expected strength of the signal transmitted by the remote transmitter and the strength of the signal that is received by terminal 110. For example, a Bluetooth transceiver and/or a WLAN transceiver within the remote transmitter can be expected to transmit with a relatively constant signal strength. Accordingly, a relationship can be defined by which the RSS distance circuit 182 can determine the distance between the terminal 110 and the remote transmitter in response to the expected strength of the remote transmitter's transmitted signal and the strength of the signal that is received by the Bluetooth transceiver 126 and/or the WLAN transceiver 124. Based on the transmission pattern and associated gain of the transmitting antenna and the receiving antenna, the transmitted and received signal strength may be related by the distance squared or the distance cubed.

The speaker characterization circuit 164 and/or the speaker recognition circuit 162 can be further configured to adapt (operation 508) the learned characteristics of the targeted speaker's voice in response to the estimated distance from the terminal 110 to the remote transmitter to compensate for the expected effects of distance on the characteristics of the targeted speaker's voice component in the microphone signal 140. As the distance to the targeted speaker increases, the adaptive sound filter circuit 150 can be tuned (via the circuits 160 and 180) to increase the amplification gain applied to the microphone signal 140 to compensate for the expected decrease in the amplitude of the targeted speaker's voice at the determined distance. Alternatively or additionally, as the distance the targeted speaker increases, the adaptive sound filter circuit 150 can be tuned (via the circuits 160 and 180) to the expected frequency range of the targeted speaker's voice at that distance, such as by moving the corner frequencies of the bandpass filtered to narrow the pass-through frequency range in the filtered signal 142 to correspond to the expected decrease in the frequency range of the targeted speaker's voice at the determined distance. Alternatively or additionally, as the distance the targeted speaker increases, the adaptive sound filter circuit 150 can be tuned (via the circuits 160 and 180) to decreasing the high-pass frequency of the high-pass filter to allow lower frequencies to pass-through to the filtered signal 142 to compensate for the expected lowering of the frequency of the targeted speaker's voice at the determined distance.

Figure 6:
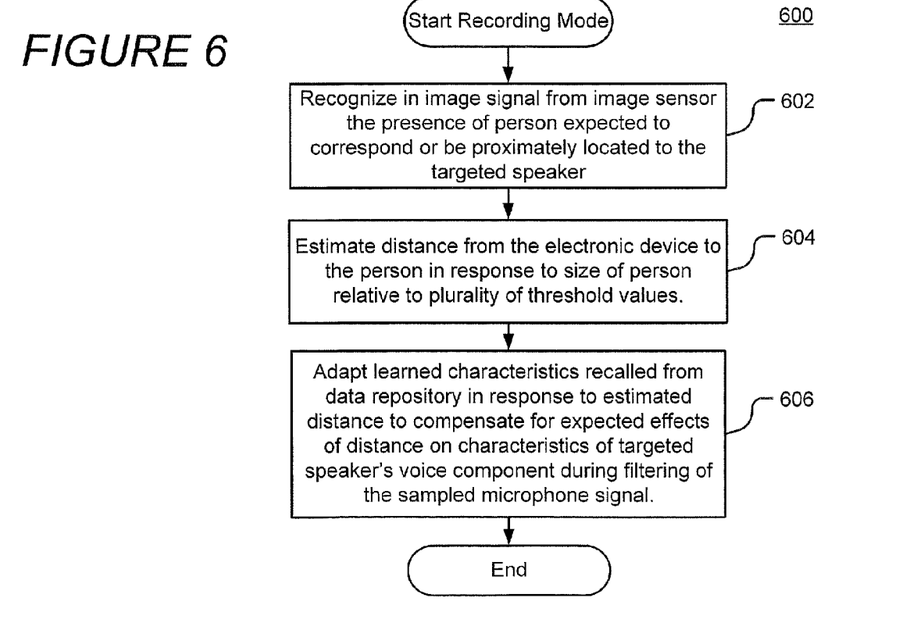
FIG. 6 is a flowchart that illustrates operations and methods during a recording mode which may be carried out by the wireless communication terminal of FIG. 1 to adapt the various learned characteristics from the training mode in response to estimated distance between the terminal and a person recognized in an image stream and who may be the targeted speaker or proximately located thereto in accordance with some embodiments of the present invention.

FIG. 6 is a flowchart that illustrates additional or alternative exemplary operations and methods 500 that may be carried out by the sound processor 114 during the recording mode to determine the distance between the terminal 110 and a person within an image stream from the camera 116 and, responsive thereto, to adapt how the various learned characteristics in the repository 166 are used to control the adaptive sound filter circuit 150 to compensate for the expected effects of the distance on the characteristics of the targeted speaker's voice component in the microphone signal 140.

Referring to FIGS. 2 and 6, the distance determination circuit 180 can include a circuit 184 that determines the size of a person's image in the image signal from the camera 116 and, responsive thereto, determines the distance between the terminal 110 and the person's image in the image stream from the camera 116 based on the size of the person's image. As shown, the image signal can also be routed to a video recorder 172, within the video and sound recorder 118, for recording therein. The circuit 184 is configured to recognize (operation 602) in the image signal the presence of a person, who may correspond to the targeted speaker or be proximately located to the targeted speaker. The circuit 184 can further estimate (operation 604) the distance from the terminal 110 to the person in response to the size of the person relative to a plurality of threshold values, where the threshold values may relate image size to expected distance. The circuit 184 may further account for a zoom setting of the camera 116 (when available) during the distance estimation. The speaker characterization circuit 164 and/or the speaker recognition circuit 162 can be further configured to adapt (operation 606) the learned characteristics of the targeted speaker's voice in response to the estimated distance from the terminal 110 to the person to compensate for the expected effects of distance on the characteristics of the targeted speaker's voice component in the microphone signal 140, such as described above with regard to operation 508 of FIG. 5.

Referring again to FIG. 2, the microphone 112 can be configured as a zoom/beam steerable microphone having a plurality of microphone elements 190a and 190b and a controllable phase combiner circuit 192 that adjusts the relative phase between signals from the microphone elements 190a and 190b in response to a phase control signal 194 and combines the adjusted phase signals to generate the microphone signal 140. The recognition controller 160 can be configured to regulate the phase control signal 194 in response to recognizing the presence of the targeted speaker's voice in the microphone signal 140 and the estimated distance from the terminal 110 to the remote transmitter and/or the person recognized in the image signal to zoom or steer the combined sensitivity of the microphone elements 190a and 190b responsive to the distance to the targeted speaker. The microphone 112 may thereby be controlled to assist with increasing the targeted speaker's voice component relative to other components in the microphone signal 140.

In the drawings and specification, there have been disclosed exemplary embodiments of the invention. However, That which is claimed:

1. An electronic device comprising:
a microphone that generates a microphone signal responsive to incident sound; and
a sound processor that is configured to recognize a targeted speaker's voice within the microphone signal and to regulate filtering of the microphone signal responsive to the recognition of the targeted speaker's voice, wherein the sound processor comprises:
a speaker characterization circuit that is configured to operate in a training mode to learn characteristics of the targeted speaker's voice component in the microphone signal, and to store the learned characteristics;
an adaptive sound filter circuit that is configured to adaptively filter the microphone signal responsive to a control signal, the adaptive sound filter circuit comprises a variable bandpass filter having bandpass frequencies that are varied in response to the control signal; and
a speaker recognition circuit that is configured to operate during a recording mode to use the learned characteristics to recognize the presence of the targeted speaker's voice in the microphone signal and to regulate the control signal to cause the adaptive sound filter circuit to adapt the filtering to increase the targeted speaker's voice component of the microphone signal relative to other components,
the adaptive sound filter circuit comprises a high-pass filter having a cutoff frequency that is varied in response to the control signal; and
the speaker recognition circuit is further configured to operate during the recording mode to respond to recognition of the presence of the targeted speaker's voice in the microphone signal by using the learned characteristics to determine a lower frequency range of the targeted speaker's voice and by regulating the control signal to vary the cutoff frequency of the high-pass filter in response to the determined lower frequency range of the targeted speaker's voice.

2. The electronic device of claim 1, further comprising:
an image sensor that is configured to generate an image signal; and
a distance determination circuit that is configured to recognize presence of a person in the image signal that is expected to correspond or be proximately located to the targeted speaker, and to estimate distance from the electronic device to the person in response to size of the person relative to a plurality of threshold values,
wherein the speaker characterization circuit is further configured to operate during the recording mode to adapt the learned characteristics of the targeted speaker's voice in response to the estimated distance from the electronic device to the recognized person to compensate for expected effects of distance on characteristics of the targeted speaker's voice component during the filtering of the microphone signal.

3. The electronic device of claim 1, further comprising an audio recorder that operates during the recording mode to record the filtered microphone signal from the adaptive sound filter.

4. An electronic device comprising:
a microphone that generates a microphone signal responsive to incident sound; and
a sound processor that is configured to recognize a targeted speaker's voice within the microphone signal and to regulate filtering of the microphone signal responsive to the recognition of the targeted speaker's voice, wherein the sound processor comprises:
a speaker characterization circuit that is configured to operate in a training mode to learn characteristics of the targeted speaker's voice component in the microphone signal, and to store the learned characteristics;
an adaptive sound filter circuit that is configured to adaptively filter the microphone signal responsive to a control signal; and
a speaker recognition circuit that is configured to operate during a recording mode to use the learned characteristics to recognize the presence of the targeted speaker's voice in the microphone signal and to regulate the control signal to cause the adaptive sound filter circuit to adapt the filtering to increase the targeted speaker's voice component of the microphone signal relative to other components,
the speaker characterization circuit is further configured to operate during the training mode to learn, from the targeted speaker's voice component in the microphone signal, a time-varying spectral pattern of the targeted speaker's voice as the targeted speaker vocalizes a particular song/speech; and
the speaker recognition circuit is further configured to operate during the recording mode to use the learned time-varying spectral pattern to recognize the presence of the targeted speaker's voice in the microphone signal vocalizing the particular song/speech, and to respond to the recognized presence by using the learned time-varying spectral pattern to vary the control signal over time to dynamically tune the adaptive sound filter circuit to track the expected time-varying spectral pattern of the targeted speaker's voice during the song/speech and to increase the targeted speaker's voice component in the microphone relative to other components.

5. The electronic device of claim 4, wherein:
the adaptive sound filter circuit comprises a variable bandpass filter having bandpass frequencies that are varied in response to the control signal;
the speaker characterization circuit is further configured to operate during the training mode to learn the time-varying spectral pattern by characterizing differences over time in the frequency range of the targeted speaker's voice in the microphone signal as the targeted speaker vocalizes the particular song/speech; and
the speaker recognition circuit is further configured to operate during the recording mode to use the learned time-varying spectral pattern to tune the bandpass frequencies of the bandpass filter to follow the differences over time in the frequency range of the targeted speaker's voice so as to increase the targeted speaker's voice component in the microphone signal relative to other components during the particular song/speech.

6. The electronic device of claim 4, wherein:
the speaker characterization circuit is further configured to operate during the training mode to learn timing of gaps where the targeted speaker's voice in the microphone signal has less than a threshold amplitude as the targeted speaker vocalizes the particular song/speech; and
the speaker recognition circuit is further configured to operate during the recording mode to use the learned gap timing to vary the control signal over time to increase the other components of the microphone signal relative to the component of the targeted speaker's voice in the microphone signal during each of the gaps and to increase the component of the targeted speaker's voice relative to the other components of the microphone signal in-between each of the gaps.

7. An electronic device comprising:
a microphone that generates a microphone signal responsive to incident sound; and
a sound processor that is configured to recognize a targeted speaker's voice within the microphone signal and to regulate filtering of the microphone signal responsive to the recognition of the targeted speaker's voice, wherein the sound processor comprises:
a speaker characterization circuit that is configured to operate in a training mode to learn characteristics of the targeted speaker's voice component in the microphone signal, and to store the learned characteristics;
an adaptive sound filter circuit that is configured to adaptively filter the microphone signal responsive to a control signal; and
a speaker recognition circuit that is configured to operate during a recording mode to use the learned characteristics to recognize the presence of the targeted speaker's voice in the microphone signal and to regulate the control signal to cause the adaptive sound filter circuit to adapt the filtering to increase the targeted speaker's voice component of the microphone signal relative to other components,
the adaptive sound filter circuit comprises a variable gain amplifier that amplifies the microphone signal and has a gain that is varied in response to the control signal;
the speaker characterization circuit is further configured to operate during the training mode to learn, from the targeted speaker's voice component in the microphone signal, a time-varying amplitude pattern of the targeted speaker's voice as the targeted speaker vocalizes a particular song/speech; and
the speaker recognition circuit is further configured to operate during the recording mode to respond to the recognized presence of the targeted speaker's voice by using the learned time-varying amplitude pattern to vary the control signal over time to dynamically tune the gain of the variable gain amplifier to track the expected time-varying amplitude pattern of the targeted speaker's voice during the song/speech.

8. An electronic device comprising:
a microphone that generates a microphone signal responsive to incident sound; and
a sound processor that is configured to recognize a targeted speaker's voice within the microphone signal and to regulate filtering of the microphone signal responsive to the recognition of the targeted speaker's voice, wherein the sound processor comprises:
a speaker characterization circuit that is configured to operate in a training mode to learn characteristics of the targeted speaker's voice component in the microphone signal, and to store the learned characteristics;
an adaptive sound filter circuit that is configured to adaptively filter the microphone signal responsive to a control signal; and
a speaker recognition circuit that is configured to operate during a recording mode to use the learned characteristics to recognize the presence of the targeted speaker's voice in the microphone signal and to regulate the control signal to cause the adaptive sound filter circuit to adapt the filtering to increase the targeted speaker's voice component of the microphone signal relative to other components,
a radio frequency receiver that is configured to receive a wireless communication signal from a remote transmitter that is carried by the targeted speaker; and
a distance determination circuit that is configured to determine a signal strength of the received communication signal, and to estimate distance from the electronic device to the remote transmitter in response to the received signal strength,
wherein the speaker characterization circuit is further configured to operate during the recording mode to adapt the learned characteristics of the targeted speaker's voice in response to the estimated distance from the electronic device to the remote transmitter to compensate for expected effects of distance on characteristics of the targeted speaker's voice component during the filtering of the microphone signal.

9. An electronic device comprising:
a microphone that generates a microphone signal responsive to incident sound; and
a sound processor that is configured to recognize a targeted speaker's voice within the microphone signal and to regulate filtering of the microphone signal responsive to the recognition of the targeted speaker's voice, wherein the sound processor comprises:
a speaker characterization circuit that is configured to operate in a training mode to learn characteristics of the targeted speaker's voice component in the microphone signal, and to store the learned characteristics;
an adaptive sound filter circuit that is configured to adaptively filter the microphone signal responsive to a control signal; and
a speaker recognition circuit that is configured to operate during a recording mode to use the learned characteristics to recognize the presence of the targeted speaker's voice in the microphone signal and to regulate the control signal to cause the adaptive sound filter circuit to adapt the filtering to increase the targeted speaker's voice component of the microphone signal relative to other components,
a radio frequency receiver that is configured to receive a wireless communication signal from a remote transmitter that is carried by the targeted speaker; and
a distance determination circuit that is configured to determine a signal strength of the received communication signal, and to estimate distance from the electronic device to the remote transmitter in response to the received signal strength,
wherein the microphone comprises a zoom/beam steerable microphone having a plurality of microphone elements and a controllable phase combiner circuit that adjusts relative phase between signals from the microphone elements in response to a phase control signal and combines the adjusted phase signals to generate the microphone signal; and
wherein the speaker recognition circuit is further configured to operate during the recording mode to regulate the phase control signal in response to recognizing the presence of the targeted speaker's voice in the microphone signal and the estimated distance from the electronic device to the remote transmitter to increase the targeted speaker's voice component in the microphone signal relative to other components.

10. The electronic device of claim 9, further comprising:
an image sensor that is configured to generate an image signal; and
a distance determination circuit that is configured to recognize the presence of a person in the image signal, and to estimate distance from the electronic device to the person in response to size of the person relative to a plurality of threshold values,
wherein the microphone comprises a zoom/beam steerable microphone having a plurality of microphone elements and a controllable phase combiner circuit that adjusts relative phase between signals from the microphone elements in response to a phase control signal and combines the adjusted phase signals to generate the microphone signal; and
wherein the speaker recognition circuit is further configured to operate during the recording mode to regulate the phase control signal in response to recognizing the presence of the targeted speaker's voice in the microphone signal and the estimated distance from the electronic device to the recognized person to increase the targeted speaker's voice component in the microphone signal relative to other components.

11. A method comprising:
computer-implemented recognition of a targeted speaker's voice within a microphone signal and regulation of filtering of the microphone signal responsive to the recognition of the targeted speaker's voice;
computer-implemented learning of characteristics of the targeted speaker's voice component in the microphone signal during a training mode, and using the learned characteristics during a recording mode to recognize the presence of the targeted speaker's voice in the microphone signal and to regulate a control signal to cause an adaptive sound filter circuit to adapt filtering of the microphone signal to increase the targeted speaker's voice component of the microphone signal relative to other components;
computer-implemented learning during the training mode of characteristic differences over time in the frequency range of the targeted speaker's voice in the microphone signal as the targeted speaker vocalizes a particular song/speech during the training mode; and
computer-implemented responding to the recognized presence of the targeted speaker's voice in the microphone signal during the recording mode by using the learned characteristic differences over time in the frequency range of the targeted speaker's voice to vary the control signal over time to dynamically tune the adaptive sound filter circuit to track the expected characteristic differences over time in the frequency range of the targeted speaker's voice during the particular song/speech and to increase the targeted speaker's voice component in the microphone relative to other components.

12. A method comprising:
computer-implemented recognition of a targeted speaker's voice within a microphone signal and regulation of filtering of the microphone signal responsive to the recognition of the targeted speaker's voice;
computer-implemented learning of characteristics of the targeted speaker's voice component in the microphone signal during a training mode, and using the learned characteristics during a recording mode to recognize the presence of the targeted speaker's voice in the microphone signal and to regulate a control signal to cause an adaptive sound filter circuit to adapt filtering of the microphone signal to increase the targeted speaker's voice component of the microphone signal relative to other components;
computer-implemented learning during the training mode of characteristic differences over time in the amplitude pattern of the targeted speaker's voice in the microphone signal as the targeted speaker vocalizes a particular song/speech during the training mode; and
computer-implemented responding to the recognized presence of the targeted speaker's voice in the microphone signal during the recording mode by using the learned characteristic differences over time in the amplitude pattern of the targeted speaker's voice to vary the control signal over time to dynamically tune a gain of a variable gain amplifier in the adaptive sound filter circuit that amplifies the microphone signal to track the expected characteristic differences over time in the amplitude pattern of the targeted speaker's voice during the particular song/speech.

13. A method comprising:
computer-implemented recognition of a targeted speaker's voice within a microphone signal and regulation of filtering of the microphone signal responsive to the recognition of the targeted speaker's voice;
computer-implemented learning of characteristics of the targeted speaker's voice component in the microphone signal during a training mode, and using the learned characteristics during a recording mode to recognize the presence of the targeted speaker's voice in the microphone signal and to regulate a control signal to cause an adaptive sound filter circuit to adapt filtering of the microphone signal to increase the targeted speaker's voice component of the microphone signal relative to other components;
computer-implemented learning during the training mode of timing of gaps where the targeted speaker's voice in the microphone signal has less than a threshold amplitude as the targeted speaker vocalizes the particular song/speech during the training mode; and
computer-implemented responding to the recognized presence of the targeted speaker's voice in the microphone signal during the recording mode by using the learned timing of gaps to vary the control signal over time to dynamically tune the adaptive sound filter circuit to increase the other components of the microphone signal relative to the component of the targeted speaker's voice in the microphone signal during each of the gaps and to increase the component of the targeted speaker's voice relative to the other components of the microphone signal in-between each of the gaps.

14. A method comprising:
computer-implemented recognition of a targeted speaker's voice within a microphone signal and regulation of filtering of the microphone signal responsive to the recognition of the targeted speaker's voice;
computer-implemented learning of characteristics of the targeted speaker's voice component in the microphone signal during a training mode, and using the learned characteristics during a recording mode to recognize the presence of the targeted speaker's voice in the microphone signal and to regulate a control signal to cause an adaptive sound filter circuit to adapt filtering of the microphone signal to increase the targeted speaker's microphone signal relative to other components;
computer-implemented estimation of distance from an electronic device to a remote transmitter that is carried by the targeted speaker in response to strength of a signal that is received by the electronic device from the remote transmitter; and computer-implemented adaptation of the learned characteristics of the targeted speaker's voice during the recording mode in response to the estimated distance from the electronic device to the remote transmitter to compensate for expected effects of distance on characteristics of the targeted speaker's voice component during the filtering of the microphone signal.

15. An electronic device comprising:

a microphone that generates a microphone signal responsive to incident sound; and a speaker characterization circuit that is configured to operate in a training mode to learn, from the targeted speaker's voice component in the microphone signal, time-varying differences in the frequency range and/or amplitude pattern of the targeted speaker's voice as the targeted speaker vocalizes a particular song/speech;

an adaptive sound filter circuit that is configured to adaptively filter the microphone signal responsive to a control signal, wherein the adaptive sound filter circuit comprises a variable bandpass filter having bandpass frequencies that are varied in response to the control signal and/or a variable gain amplifier having a gain that is varied in response to the control signal; and a speaker recognition circuit that is configured to use the learned time-varying differences in the frequency range and/or amplitude pattern of the targeted speaker's voice to recognize the presence of the targeted speaker's voice in the microphone signal vocalizing the particular song/speech during a recording mode, and to respond to the recognized presence by using the time-varying differences in the frequency range and/or the amplitude pattern of the targeted speaker's voice to vary the control signal over time to dynamically tune the bandpass frequencies of the bandpass filter to follow the differences over time in the frequency range of the targeted speaker's voice and/or to dynamically tune the gain of the variable gain amplifier to follow the differences over time in the amplitude pattern of the targeted speaker's voice.

* * * * *

UNITED STATES PATENT AND TRADEMARK OFFICE
CERTIFICATE OF CORRECTION

| | |
|---|---|
| PATENT NO. | : 7,974,841 B2 |
| APPLICATION NO. | : 12/038118 |
| DATED | : July 5, 2011 |
| INVENTOR(S) | : Bengtsson |

It is certified that error appears in the above-identified patent and that said Letters Patent is hereby corrected as shown below:

Column 18, Claim 14, Line 64:  Please correct "targeted speaker's"
to read -- targeted speaker's voice component of the --

Signed and Sealed this
Tenth Day of April, 2012

David J. Kappos
*Director of the United States Patent and Trademark Office*